United States Patent [19]

Aichinger

[11] 4,155,698
[45] May 22, 1979

[54] METHOD AND APPARATUS FOR INJECTION MOLDING OF PLASTIC CLOSURES

[75] Inventor: Dietmar Aichinger, Arlesheim, Switzerland

[73] Assignee: Albert Obrist AG, Reinach, Switzerland

[21] Appl. No.: 792,500

[22] Filed: May 2, 1977

Related U.S. Application Data

[63] Continuation-in-part of Ser. No. 566,096, Apr. 8, 1975, Pat. No. 4,033,472.

[51] Int. Cl.² .................................................. B29C 7/00
[52] U.S. Cl. .................................. 425/556; 425/438; 425/441
[58] Field of Search ................. 425/418, 450.1, 556, 425/436 R, 438, 441, 443

[56] References Cited

U.S. PATENT DOCUMENTS 2,799,049   7/1957   Wilson ............................. 425/556 X

FOREIGN PATENT DOCUMENTS 682539   11/1952   United Kingdom .................... 425/556

*Primary Examiner*—Richard B. Lazarus
*Attorney, Agent, or Firm*—Larson, Taylor and Hinds

[57] ABSTRACT

A method for molding a plastic closure cap unit for a container, which cap unit comprises an internally threaded upper closure cap and a downwardly extending skirt forming a sealing ring connected thereto through an intermediate shear zone of reduced thickness, the sealing ring increasing in thickness downwardly from the shear zone and being devoid of abrupt changes in contour such as would preclude axial removal of the cap and sealing ring from a non-expanding mold surrounding the sealing ring, comprises injecting molten plastic into a mold shaped to form the cap unit and including fixed and movable sections forming mold surfaces, disengaging the mold from the outer surface of the upper closure cap by axial movement of the related mold section relative to the remaining sections, then disengaging the mold from the inner surfaces of the closure cap and sealing ring by axial movement of the related mold section relative to the remaining section of the mold still surrounding the outer wall of the sealing ring up to the lower rim of the upper closure cap, and then disengaging the mold from the cap unit by axial movement of the cap unit relative to the remaining section of the mold surrounding the sealing ring. The mold itself comprises first and second female mold sections engageable to form the outer surfaces respectively of the upper closure cap and the sealing ring, and a male mold section cooperating with the female mold sections to form the inner surface of the closure cap unit. Mold operating means effect the axial movements to effect removal of the cap unit from the mold.

3 Claims, 5 Drawing Figures

METHOD AND APPARATUS FOR INJECTION MOLDING OF PLASTIC CLOSURES

REFERENCE TO RELATED APPLICATIONS

This application is a continuation-in-part of my earlier copending application Ser. No. 566,096, filed Apr. 8, 1975, now U.S. Pat. No. 4,033,472, for "Closure for Containers." The instant invention involves method and apparatus for injection molding of plastic closures as disclosed in said copending application, and the disclosure of said copending application is incorporated herein by reference.

FIELD OF THE INVENTION

This invention relates to methods and apparatus for production of plastic closure caps for closing receptacles, particularly internally threaded closure caps of the type having guard rings or sealing rings which are deformed into locking engagement with the container and are at least partially severable from the main body of the cap along a predetermined tear line upon removal of the closure from the container. Such closure caps are preferably as disclosed and claimed in said parent application Ser. No. 566,096, although the instant invention also may encompass methods and apparatus for production of embodiments other then specifically as disclosed or illustrated in said parent application.

BACKGROUND AND SUMMARY OF INVENTION

Plastic closure caps made by injection molding are known and used in great numbers. There are many problems in mass production of such closure caps, which manufacture should be extraordinarily rapid and economical in view of the required low manufacturing cost. Many tools or molds used in the manufacture of such closure caps involve radially opening mold parts, which I consider to be much too expensive in production and maintenance, and additionally such parts work too slowly and are subject to malfunction and/or breakdown. Also, tools or molds for production of screw closures where the caps are turned or screwed out of the mold after completion of the injection process are believed not sufficiently competitive because of the high manufacturing and operating costs associated with them.

Quite special problems arise if closure caps are involved that have a guard ring or sealing ring which is to be heat-formed and sealed on the container. Such sealing rings are well known in themselves, and are sometimes referred to as tamper rings. Such rings are provided with a weakened zone or tear zone that is torn in the first opening movement of the cap from the bottle, and thus indicate whether or not the bottle has been opened or unsealed. These weakening lines increase the problems in manufacture of plastic closures of this kind, because there is a danger that a tear will be initiated along the weakening line in removal of the closure cap from the molding tool.

The instant invention is addressed to the problem of avoiding the drawbacks of known arrangements, and hence is directed particularly to methods and apparatus for production of a plastic closure cap device comprising a closure cap and sealing ring, and is intended to allow simple and quick production, together with reduced initial expenditure and subsequent maintenance costs for the apparatus.

Generally in accordance with the invention, a method is provided for molding a plastic closure cap unit for a container, the cap unit comprising an upper closure cap with a generally cylindrical wall portion including an inner surface with an integrally molded internal thread and an outer surface, the generally cylindrical wall portion having a downwardly extending integrally molded generally cylindrical skirt forming a sealing ring, and an intermediate shear zone having a reduced thickness in cross-section and forming a connection between the sealing ring and the lower annular rim of the upper closure cap, the sealing ring increasing in thickness downwardly from the shear zone and as it increases in thickness being devoid of abrupt changes in the contour of its walls such as would preclude axial removal of the cap and sealing ring from a non-expanding mold surrounding the sealing ring during formation in a molding process. The method comprises injecting a molten plastic into a mold shaped to form the plastic cap unit and including fixed and movable sections forming molding surfaces, disengaging the mold from the outer surface of the upper closure cap by axial movement of the related mold section relative to the remaining sections of the mold, disengaging subsequently the mold from the inner surfaces of the upper closure cap and the lower sealing ring by axial movement of the related mold section relative to the remaining fixed section of the mold still surrounding the outer wall of the sealing ring up to the lower rim of the upper closure cap, and disengaging subsequently the mold from the cap unit by axial movement of the cap unit relative to the fixed section of the mold.

It will be understood that the invention thus allows the ejection of the closure device from the mold or tool without radial opening of the mold, and in a very simple manner. In the course of the method or process as described, first an external mold part, which is a first female section, is removed from the closure cap. The closure cap thereby has enough elasticity over its total length to allow release and removal in the next step of the internal mold section, which is the male section. This is achieved by having the closure cap axially completely released over its entire periphery, because the internal thread in the closure cap makes an elastic stretching or yielding indispensable for axially removing the male section without rotation or unscrewing. This again is only possible because the closure device during this step is still held fast by the second external part, which is the second female section, in the region of the sealing ring. Since the closure cap is, of course, released completely at the outside, but is applied with its lower edge or rim on the second female mold section, the closure cap will bear firmly on the said lower edge or rim while the internal male section is withdrawn from the closure cap unit. After this step, the closure cap unit will still be held in the zone of the sealing ring by the second female mold section, but it can now readily be ejected from the mold because the internal male mold section has already released the sealing ring at the inside, and thus an inward elastic yielding of the guard ring is allowed, whereby destruction in ejection is avoided.

The apparatus of the invention is especially advantageous for production of the described closure cap in accordance with the method of the invention. For this purpose, the apparatus comprises a first female mold section having a cavity and being constructed to form the outer surface of the upper closure cap, a second female mold section having a cavity and being constructed to form the outer surface of the sealing ring and shear zone, the second female mold section being engageable with the first female mold section so as to form a combined female mold section for integrally molding the outer surfaces of the upper closure cap and the sealing ring, the second female mold section being at least partially reduced in diameter in the area engageable with the first female mold section so as to form at least the outer part of the lower annular rim of the upper closure cap, a male mold section cooperating with the first and second female mold sections and being constructed to form the inner surface of the closure cap unit, and mold operating means drivingly connected to the mold sections so as to effect, after the molding process, disengagement of the first female mold section from the closure cap by axial movement relative to the second female mold section and relative to the male mold section, disengagement of the male section from the cap unit by axial movements relative to the second female mold section, and disengagement of the second female mold section from the sealing ring by axial movement of the cap relative to the second female mold section. Preferably the male mold section includes at least one inner part or member which is axially movable against the upper inner surface of the closure cap after disengagement of the male mold section from the cap unit so as to effect disengagement of the sealing ring from the second female mold section.

The invention affords, in an optimally simple way, a new method and new apparatus for economical and rapid manufacture of plastic closure caps. The technological advance and the inventive content of the subject matter are effected not only by the novel individual features, but also by the combinations of features.

Preferred embodiments of the invention are described in detail in the ensuing description, taken with reference to the accompanying drawings.

DESCRIPTION OF THE PREFERRED EMBODIMENTS

Figure 1:
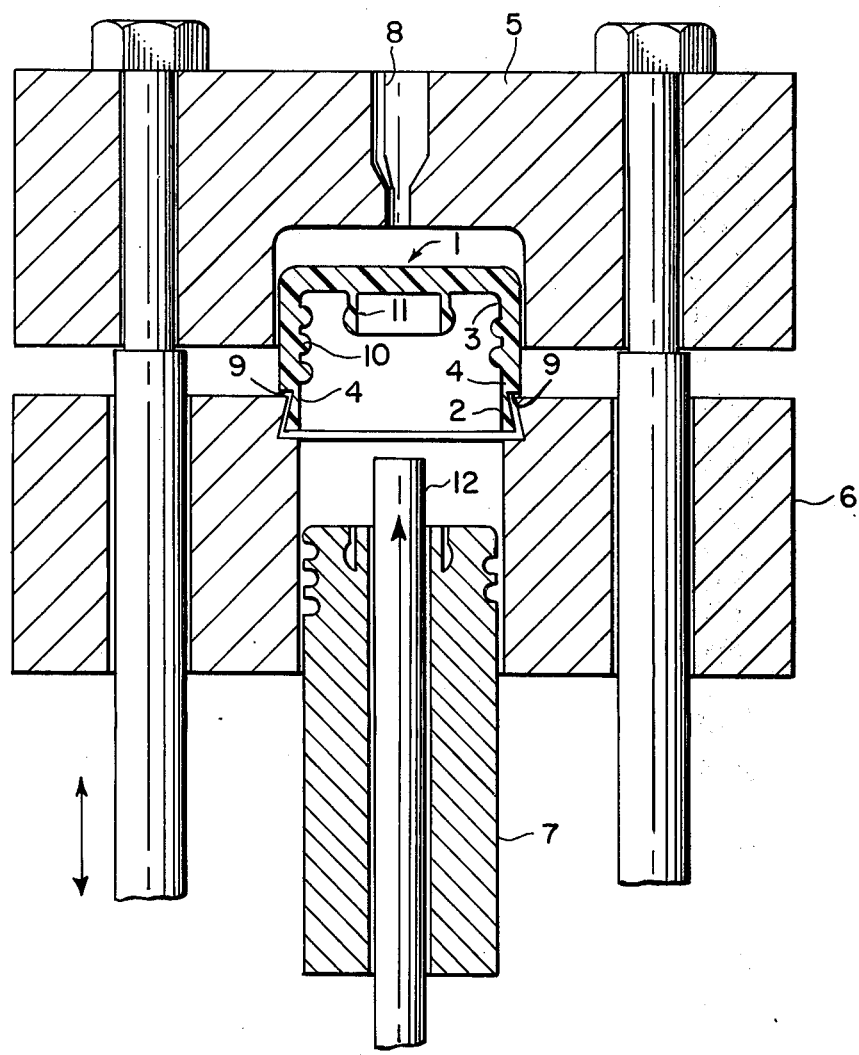
FIG. 1 is a section through the mold part of a tool embodying the characteristics of the invention.
Figure 2:
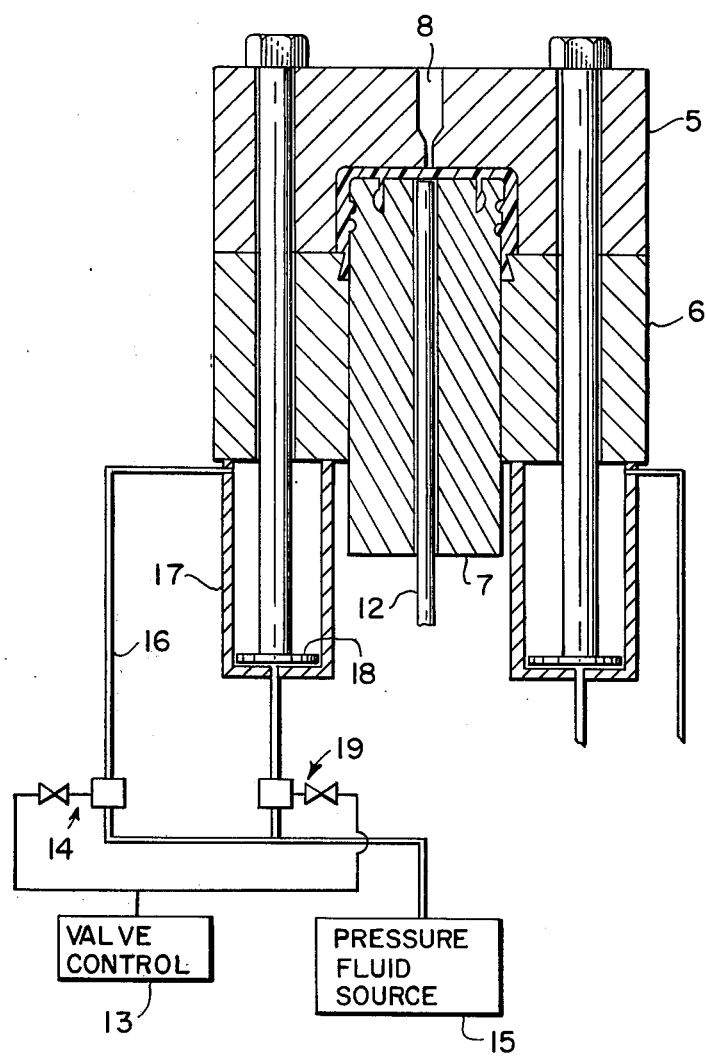
FIGS. 2–5 show the tool of FIG. 1 on a smaller scale, and with additional operating members, during the various phases of the opening and ejecting process.

As shown in FIG. 1, a closure cap device or unit 1 comprises a sealing ring or guard ring 2 and an upper closure cap 3. Sealing ring 2 is integrally injection molded with closure cap 3, and is connected with the latter by a weakened zone or tear line 4. Closure cap device 1 is produced in the injection mold which is constituted by a first female mold portion 5, a second female mold portion 6, and an internal male mold portion 7. Injection point 8 allows for injection of liquid plastic into the mold cavity.

The individual mold parts 5 to 7 are shown in FIG. 1 in a partially opened position, for purposes of clarity. This partially open position does not, however, correspond to any step in the course of the process, and is merely presented for purposes of illustration.

As the drawing shows, the first female mold part 5 forms the outer surface of upper closure cap 3. The second female mold part 6 is engageable with the first female mold part 5, and forms on the one hand the lower edge 9 of upper closure cap 3, and on the other hand the outer surface of sealing ring 2, including the weakened zone 4. The upper closure cap is of generally cylindrical form, although it will be readily understood that it need not be perfectly cylindrical. It could, for instance, have a radial cross-section of other than perfectly circular, and in axial section there could be an upward and inward taper of the outer surface. The important consideration is that the outer surface of upper closure cap 3 be of such configuration as to permit axial withdrawal of female mold part 5, and it is intended that "generally cylindrical" encompass all such configurations. Preferably, however, the outer surface is substantially perfectly cylindrical, being substantially straight line as viewed in axial section, as shown in FIG. 1.

The male mold part 7 runs axially and movably into the female mold parts, and constitutes the mold section for the inner surface of the cap, whereon there is a screw thread 10 and a sealing part 11. In addition, male mold part 7 also constitutes the mold for the internal surface of sealing ring 2, whose inner wall is substantially aligned with the inner wall of upper closure cap 3. Of course, with suitable configuration of the second female portion 6 and adaptation of the male portion 7, there can also be an outward displacement of sealing ring 2 on the lower edge 9 of upper closure cap 3. It is important, however, that at least partly on the periphery of closure cap 3 the second female mold part 6 be applied on the lower edge 9 of closure cap 3. The reason for this resides in the opening process in accordance with the invention, which provides that closure cap 3 be entirely released on the outside because the first female mold portion 5 is drawn off axially after injection of the plastic at injection point 8, and hardening thereof. The invention thereby makes it possible, in the second step, to pull male mold part 7 out of closure cap 3 even though there are protrusions and undercuts because of thread 10. Since the female mold part 5 is axially removed, closure cap 3 can yield elastically when male mold part 7 is withdrawn, so that the thread 10 is not damaged. During the extraction, closure cap 3 bears on the second female mold portion 6 thus serrves as a support or backup for this withdrawal process. Since the second female part 6 is directly applied to lower edge 9 of closure cap 3, any stress and deformation of sealing ring 3 during withdrawal of male portion 7 is avoided. After the external and internal release of closure cap 3, the closure cap device is still held by the second female mold portion 6, only in the region of sealing ring 2. Because sealing ring 2, as it increases in thickness, has no abrupt changes in the contour of its outer surface, whether in the form of abrupt undercuts or abrupt protrusions, the closure cap device 1, in the third process step, can be ejected by simple axial movement from the second female portion 6. This is effected, as schematically indicated, by an internal ejector part 12 provided in male tool part 7. After the conclusion of the first two steps of the process or method, the ejector part 12 is moved axially for ejection of closure cap device 1, bearing against the inner floor of upper closure cap 3, and releasing the sealing ring 2 from its hold in the second female portion 6.

The described process or method is distinguished both by the simplicity of the tool construction and by operational reliability. The tool itself consists essentially of four movable parts, and only axial movements are needed for the injection and subsequent ejection of closure cap 1, which can be effected very rapidly. On the other hand, in extraction of male part 7, the cap 3 is acceptably held and supported by bearing on its lower edge 9 against second female portion 6, to overcome resistance in extraction of male part 7. On the other hand, sealing ring 2, which is very easily damaged in weakening zone 4, can be removed from the mold with the required precision.

FIGS. 2 through 5 show the sequence of the process or method, as well as the operation of the tool in the successive steps of the opening process. According to FIG. 2, the overall device is still closed, and closure cap device 1 has just been injected. In this state, the individual mold parts 5, 6 and 7 are held firmly closed by known control devices. As indicated schematically, a valve 14 is opened for this purpose by means of a control device 13 so that pressure medium flows from a receptacle 15 via a conduit 16 into a cylinder 17, and thereby holds piston 18 in its closed position.

Figure 3:
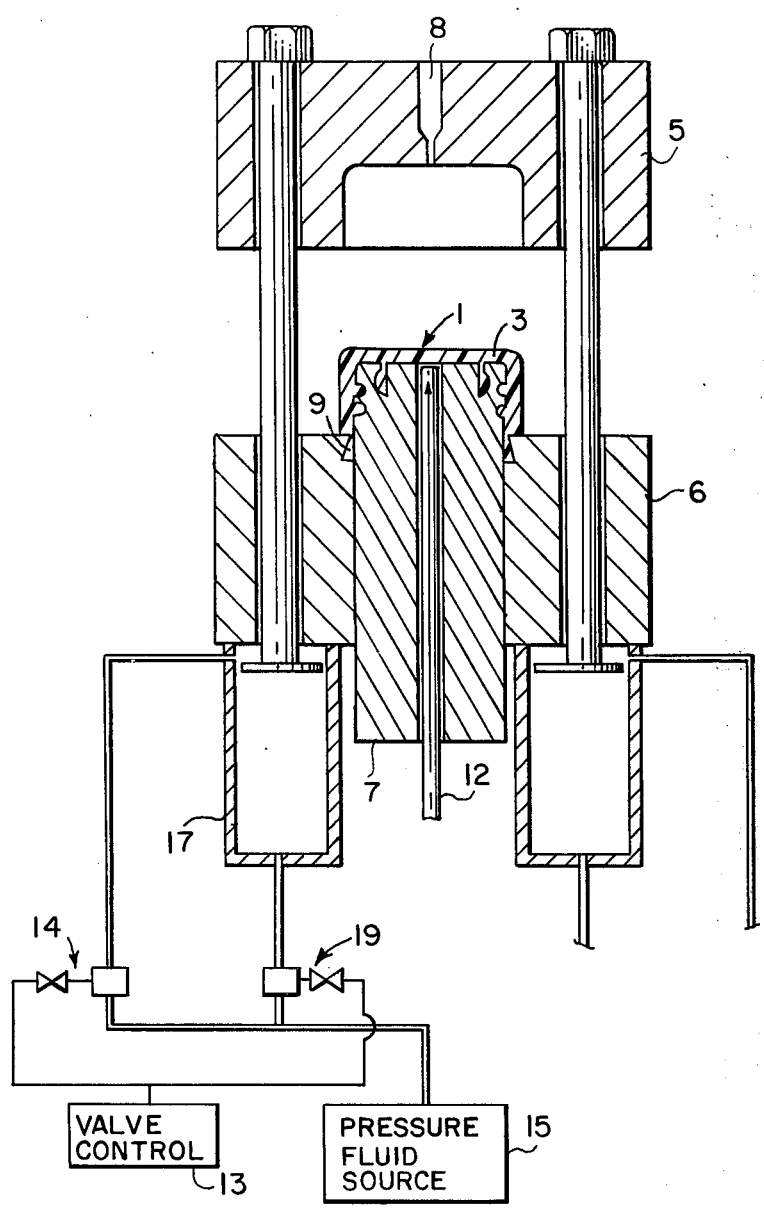

FIG. 3 shows the first opening step, where control device 13 has closed valve 14, and by opening a valve 19 leads pressure medium into the lower part of cylinder 17, and thereby moves piston 18 into its upper or open position. The passages for release of pressure medium from the two chambers of cylinder 17 that are defined by piston 18 in a known way are not illustrated. In fact, the entire control arrangement is one generally known in the state of the art, may be considered as conventional, and accordingly is not shown or described in any needless detail.

Figure 4:
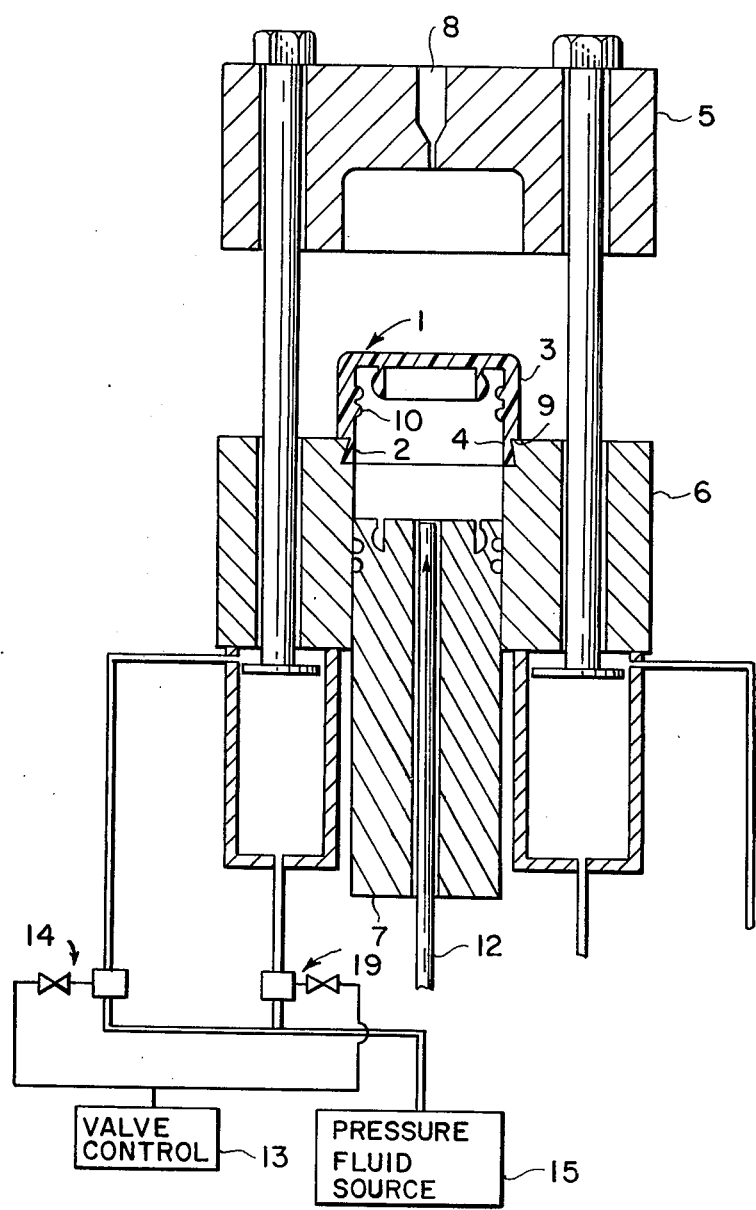

FIG. 3 shows that upper closure cap 3 has been entirely released on the outside, although closure cap device 1 is held by positive engagement in the region of thread 10 on male mold part 7. FIG. 4 shows how in the next step the male mold part 7 is released from the closure cap device 1 by axial withdrawal. It is possible to do this without rotating or unscrewing the male mold part 7 because cap 3 is free on its outside surface, and therefore is able to yield elastically while thread 10 is freed from the mold. Also, closure cap 3 is braced on lower edge 9 by the second female mold part 6, so that there is a backup for stresses occurring in the removal of male mold part 7.

Figure 5:
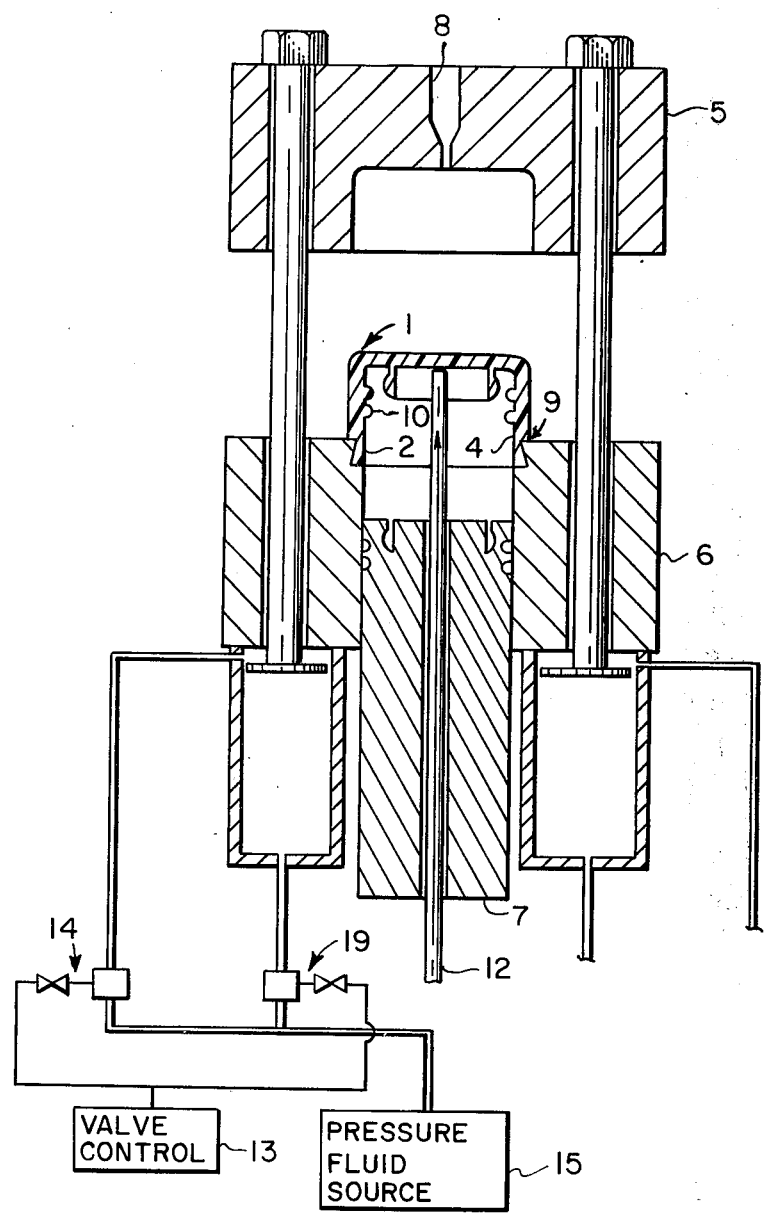

FIG. 5 shows the start of the final step of the process in which, after internal mold part 7 has been removed, the internal ejector part 12 is pressed against the roof of the cap, whereby the entire cap is released from the second female mold portion 6. This is possible without damage to weakened zone 4 because the guard ring 2 has no undercuts or abrupt changes of surface contour, and because also after release by male mold part 7 the sealing ring 2 can yield flexibly inwardly during the ejection.

Obviously the illustrated and described embodiments can be varied or modified without exceeding the scope of the invention. In particular, for example, it is possible readily to imagine other surface configurations for sealing ring 2, so long as they are not such as to preclude axial removal of the cap and sealing ring from a non-expanding mold engaging the sealing ring. Obviously the schematically illustrated control device could be modified, and, if need be, manual operation could be accomplished.

I claim:

1. Apparatus for forming a molded thermoplastic closure cap unit for a container, said cap unit having an upper closure cap with a generally cylindrical wall portion including an inner surface with an integrally molded internal spiral-screw thread and an outer surface, said generally cylindrical wall portion having a downwardly extending integrally molded generally cylindrical skirt forming a sealing ring, and an intermediate shear zone having a reduced thickness in cross section and forming a connection between said sealing ring and the lower annular rim of said upper closure cap, said sealing ring increasing in thickness downwardly from the shear zone and as it increases in thickness being devoid of abrupt changes in the contour of its walls such as would preclude axial removal of the cap and sealing ring from a non-expanding mold surrounding the sealing ring during formation in a molding process, said apparatus having a plurality of relatively axially movable mold sections and comprising (a) a first female mold section having a cavity and being constructed to form said outer surface of said upper closure cap, (b) a second female mold section having a cavity and being constructed to form the outer surface of said sealing ring and shear zone, said second female mold section being engageable with said first female mold section so as to form a combined female mold section for integrally molding the outer surfaces of said upper closure cap and said sealing ring, said second female mold cavity being at least partially reduced in diameter in the area engageable with said first female mold section such that said second female mold section forms at least the outer part of the lower annular rim of said upper closure cap, (c) an axially movable, non-rotary male mold section cooperating with said first and second female mold sections and being constructed to form said threaded inner surface of said closure cap unit, and (d) mold operating means drivingly connected to said mold sections so as to effect, sequentially, after the molding process (i) disengagement of said first female mold section from the closure cap by axial movement relative to said second female mold section and relative to said male mold section, (ii) disengagement of said male section from said cap unit by non-rotary axial movement of said male section relative to said second female mold section, and (iii) disengagement of said second female mold section from said sealing ring by axial movement of said cap unit relative to said second female mold section.

2. Apparatus as set forth in claim 1 in which said male mold section includes at least one inner part being axially movable against the upper inner surface of said closure cap after disengagement of the male mold section from the cap unit so as to effect disengagement of the sealing ring from the second female mold section.

3. Apparatus as set forth in claim 1 wherein said second female mold cavity is of approximately frusto conical configuration, with the portion of greater diameter being relatively away from the first female mold section, and said female mold sections engage in the plane of the lower annular rim of said upper closure cap.

* * * * *